United States Patent [19]

Ishizuka et al.

[11] 4,322,107
[45] Mar. 30, 1982

[54] STRUCTURE FOR MOUNTING COVER OF CONTROLLER IN BATTERY FORK LIFT

[75] Inventors: Hiroshi Ishizuka, Tokyo; Kazuhiko Kunogi, Hino, both of Japan

[73] Assignee: Nissan Motor Company, Limited, Yokohama, Japan

[21] Appl. No.: 145,728

[22] Filed: May 1, 1980

[30] Foreign Application Priority Data

May 11, 1979 [JP] Japan .................. 54/63198[U]

[51] Int. Cl.³ .................................. B60R 18/02
[52] U.S. Cl. ..................... 296/146; 180/89.1; 280/755
[58] Field of Search ............... 180/89.1, 89.17, 89.11; 296/37.1, 37.6, 146; 16/116, 117, 135; 49/381, 482, 398; 280/755

[56] References Cited

U.S. PATENT DOCUMENTS

| 3,104,738 | 9/1963 | Benham | 49/381 |
|---|---|---|---|
| 3,134,603 | 5/1964 | Rogers | 296/37.1 X |
| 3,155,443 | 11/1964 | Meilinger | 49/382 X |
| 3,331,161 | 7/1967 | Ruff | 49/382 X |
| 3,430,386 | 3/1969 | Sandin et al. | 49/382 |
| 3,713,688 | 1/1973 | Monroe | 280/756 X |
| 3,762,761 | 10/1973 | Erickson | 280/756 X |
| 4,026,378 | 5/1977 | DePriester | 280/756 X |

FOREIGN PATENT DOCUMENTS

| 349454 | 5/1931 | United Kingdom . |
|---|---|---|
| 366700 | 2/1932 | United Kingdom . |
| 469902 | 8/1937 | United Kingdom . |
| 503888 | 4/1939 | United Kingdom . |
| 506187 | 5/1939 | United Kingdom . |
| 708360 | 5/1954 | United Kingdom . |
| 824985 | 12/1959 | United Kingdom . |
| 900552 | 6/1962 | United Kingdom . |
| 1333377 | 10/1973 | United Kingdom . |
| 1381068 | 1/1975 | United Kingdom . |
| 1497254 | 1/1978 | United Kingdom . |
| 2020351 | 11/1979 | United Kingdom . |

Primary Examiner—Joseph F. Peters, Jr.
Assistant Examiner—Randall A. Schrecengost

[57] ABSTRACT

A structure is disclosed for mounting a cover which closes a controller room of a battery-driven fork lift, and the structure includes body-side hinge members integrally molded in a counter-weight of fork lift body and cover-side hinge members fixed to the cover in such a manner that the cover-side hinge members can be brought into detachable engagement with the body-side hinge members simply by allowing the cover-side hinge members to drop toward the body-side hinge members together with the cover by the weight thereof.

8 Claims, 11 Drawing Figures

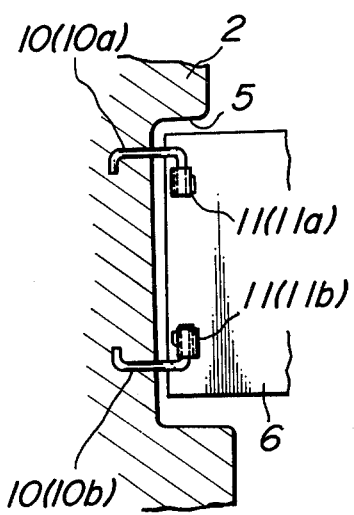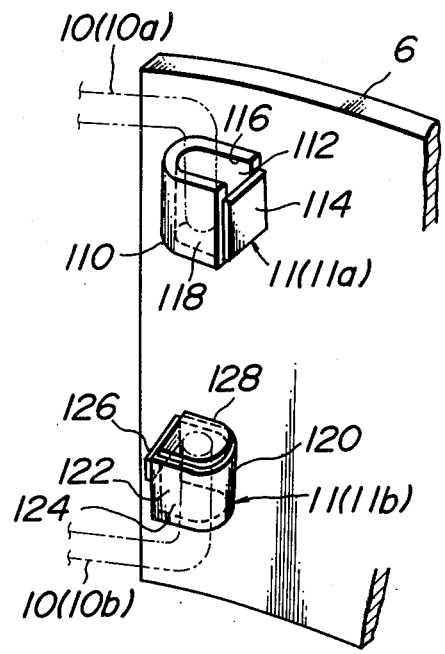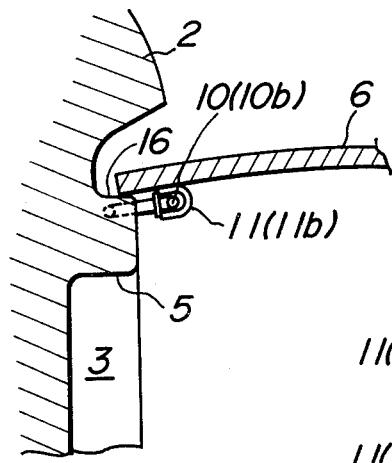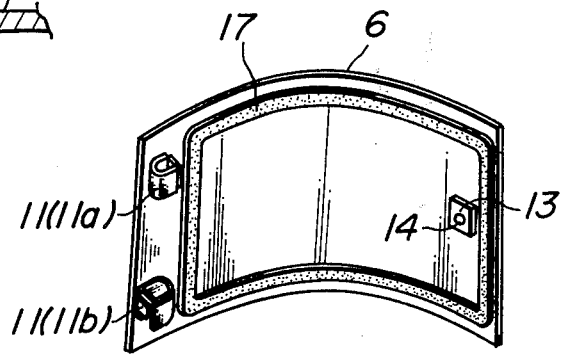

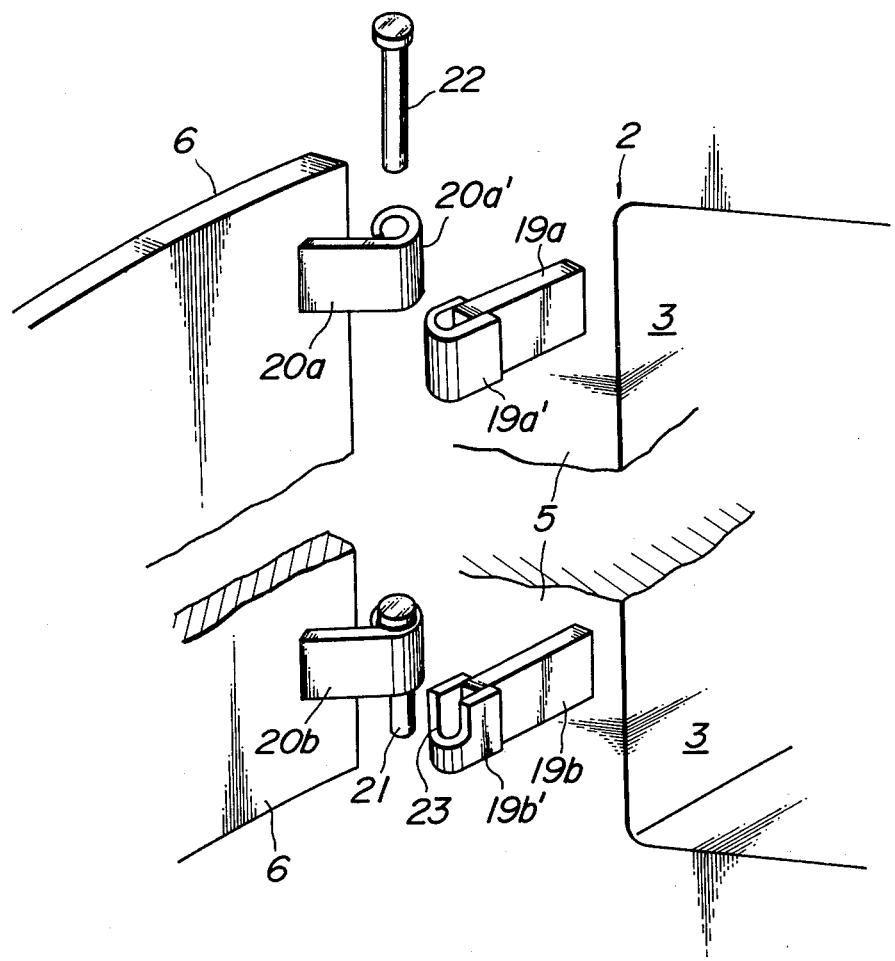

STRUCTURE FOR MOUNTING COVER OF CONTROLLER IN BATTERY FORK LIFT

BACKGROUND OF THE INVENTION

1. Field of the Invention

This invention relates to a structure for mounting a cover of a controller room of a battery fork lift.

2. Description of the Prior Art

In a battery fork lift, the weight of its batteries is similar to that of a counterweight of a gasoline car, so that the counterweight of the battery fork lift can be comparatively light, and a controller is placed in a controller room defined in the comparatively light counterweight. The controller room is closed by a cover. To protect the controller from any damage during baggage handlings in limited spaces, the cover of the controller room is made comparatively thick and heavy, and the cover is fixed to the counterweight securely at several points by bolts so as to prevent the cover from accidental falling off. Such mounting of the cover to the controller room with bolts has shortcomings in that the tightening and loosening of the bolts for maintenance and inspection are time consuming, and the operation of the maintenance and inspection is cumbersome and time consuming.

SUMMARY OF THE INVENTION

Therefore, the present invention obviates the aforesaid shortcomings of the prior art techniques, by providing an improved structure for mounting a cover of a controller room of a battery fork lift. In the structure according to the present invention, the cover is mounted to an edge portion of the opening of a controller room in a swingable manner by a hinge mechanism, and the cover which is heavy can be easily and steadily mounted to the battery fork lift by using the weight of the cover itself.

BRIEF DESCRIPTION OF THE DRAWING

For a better understanding of the invention, reference is made to the accompanying drawing, in which:

FIG. 4 is a sectional view taken along the line IV—IV of FIG. 2;

FIG. 5 is a perspective view showing the manner in which cover-side hinge members are secured to the cover;

FIG. 6 is a schematic sectional view of a portion where a stopper is formed;

FIG. 7 is a schematic perspective view of the back side of a cover;

FIG. 10 is an exploded view of another hinge mechanism usable in the structure according to the present invention.

Like parts are designated by like numerals and symbols throughout the different views of the drawing.

DESCRIPTION OF THE PREFERRED EMBODIMENTS

Figure 1:
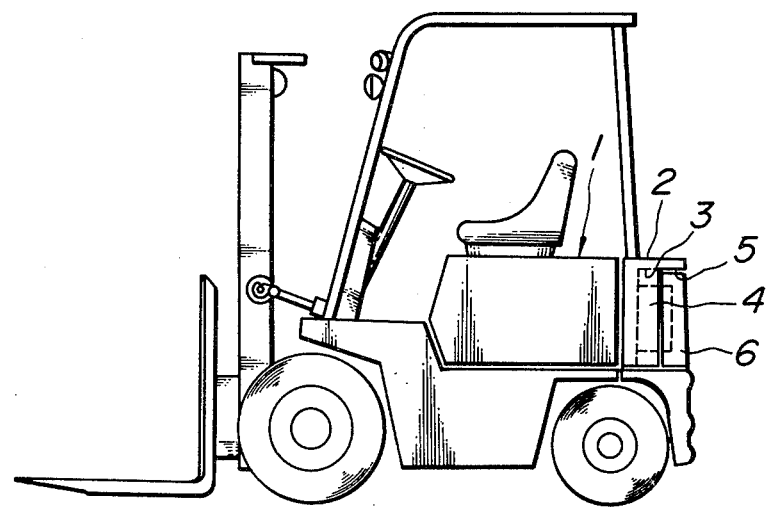
FIG. 1 is a schematic side view of a fork lift.
Figure 2:
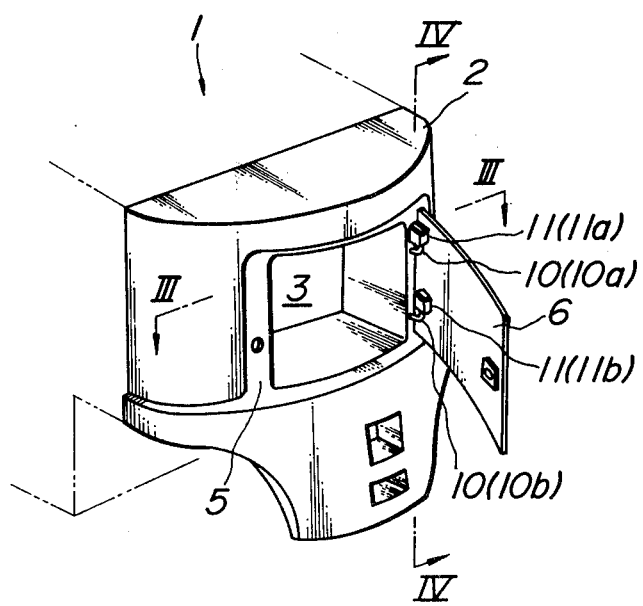
FIG. 2 is a schematic perspective view illustrating a structure according to the present invention.
Figure 3:
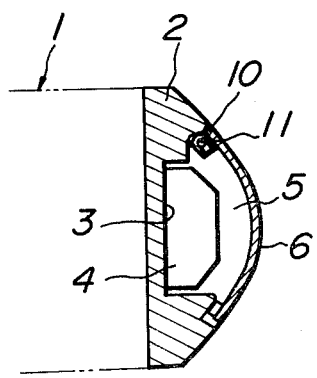
FIG. 3 is a sectional view taken along the line III—III of FIG. 2.

Referring to FIG. 1, a fork lift body 1 of battery driving type has a comparatively light counterweight 2 disposed at a rear end portion thereof, and a controller room 3 is formed in the counterweight 2 for providing a space for installing a controller 4. At an opening 5 of the controller room 3, a cover 6 is provided for closing the room and protecting the controller 4 against direct interference from the outside the room 3. This cover 6 is required to be comparatively thick and heavy, so as to ensure proper protection even when baggages or other objects hit and deform the cover during operation of the fork lift in a limited space. In fork lifts of the prior art, the cover 6 is secured to the counterweight 2 by a plurality of bolts, which are cumbersome for screwing and unscrewing each time the cover is required to be removed for maintenance and inspection.

In a preferred embodiment of the present invention as illustrated in FIGS. 2 through 5, body-side hinge members 10a and 10b are fixed to upper and lower portions along one side edge of the opening 5 of the controller room 3, for instance by casting integrally with the counterweight, while cover-side hinge members 11a and 11b are fixed to upper and lower portions along one side edge of the cover. The body-side hinge members 10a, 10b engage the cover-side hinge members 11a, 11b respectively, for swingably supporting the cover 6. The free end of the cover 6, or the opposite edge of the cover 6 to the hinged edge, is secured to the corresponding edge of the opening 5 of the controller room 3 at one position by a bolt 12 (see FIG. 8).

In the aforesaid embodiment of the invention, the two body-side hinge members 10a and 10b consist of the U-shape round steel bars molded in the edge of the opening 5 in such a manner that the leg portions of the two hinge members extend toward each other, as clearly shown in FIG. 4. On the other hand, the upper cover-side hinge member 11a secured to the cover 6 is of substantially cylindrical shape; more particularly, a steel sheet 110 is so bent as to form a U-shape cross section with an open end 112, and another steel sheet 114 is welded to the lower portion of the open end 112, so that a cylindrical hinge member with upper and lower openings 116 and 118. The lower cover-side hinge member 11b is made by bending a steel sheet 120 so as to form a U-shape cross section disposed in opposite direction to that of the aforesaid steel sheet 110, and welding steel sheets 126 and 128 to upper portion of a side opening 122 and top opening of the thus bent steel sheet 120, respectively, so that a cylindrical hinge member with only lower end 124 left open is provided. Both of the cover-side hinge members 11a and 11b are welded to the back surface of the cover 6.

To mount the cover 6 onto the opening 5 of the controller room 3 by the hinge members of the aforesaid construction, the cover 6 is at first brought to such an open position thereof where the upper body-side hinge member 10a is allowed to enter the upper cover-side hinge member 11a, and the cover 6 is pushed upwards with the hinge member 10a fitted in the hinge member 11a until the opening 122 of the cover-side hinge member 11b faces the lower body-side hinge member 10b from above, and then the cover 6 is dropped so that the lower body-side hinge member 10b fits in the lower cover-side hinge member 11b through the opening 122. Thus, the body-side hinge member 10 and the cover-side hinge member 11 are brought into detachable engagement in a reliable fashion by using the weight of the cover 6 itself. When the cover 6 is at its closed position, the steel sheets 11a and 12b function as stoppers which prevent the hinge members 10 from disengaging from the hinge members 11.

Figure 8:
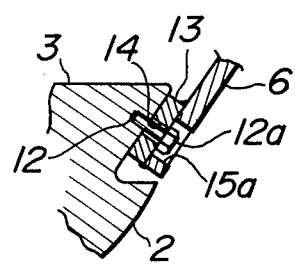
FIG. 8 is a partial sectional view showing a portion where the free end of the cover is fastened.

To facilitate the fastening of the free end of the cover 6 to the edge of the opening 5 by the bolt 12, a lock plate 13 with a bolt hole 14 bored therethrough is welded to the back surface of the free end portion of the cover 6, as shown in FIGS. 7 and 8. A bolt head hole 15 may be bored through the cover 6 in a coaxial fashion with the aforesaid bolt hole 14, so that when the cover 6 is fastened by the bolt 12, the head 12a of the bolt 12 can be sunk in the bolt head hole 15. Accordingly, the surface of the cover 6 is made free from any projection, and an advantage of preventing the bolt head 12a from colliding or contacting with other machines or baggages during the operation of the fork lift can be achieved.

Referring to FIG. 6, a stopper 16 may be formed as an integral part of the edge portion of the opening 5 in such a manner that, when the cover 6 is opened to a certain position, the back side of the hinged end of the cover 6 comes in contact with the stopper 16 for limiting the opening movement of the cover 6. Whereby, another advantage of preventing the surface of the cover 6 from coming in contact with the surface of the counterweight 2 and scratching each other can be achieved. Furthermore, a weather strip 17 may be secured to the back surface of the cover 6 along the edges thereof as shown in FIG. 7, which weather strip 17 comes in tight contact with the edges of the opening 5 as the cover 6 is closed for ensuring good sealing along the periphery of the opening 5 with the cover 6 at the closed position.

Figure 9A:
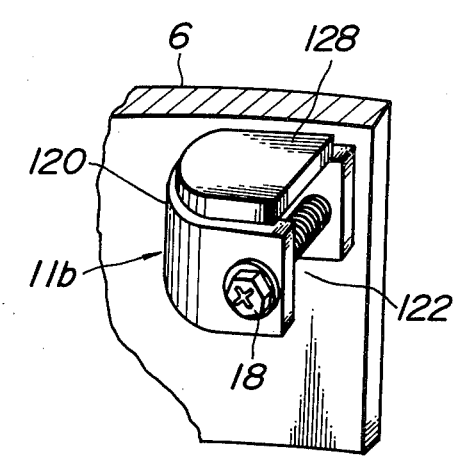
FIGS. 9A and 9B are a schematic perspective view of another embodiment of the present invention and a fractional view showing the manner in which the embodiment is mounted.
Figure 9B:
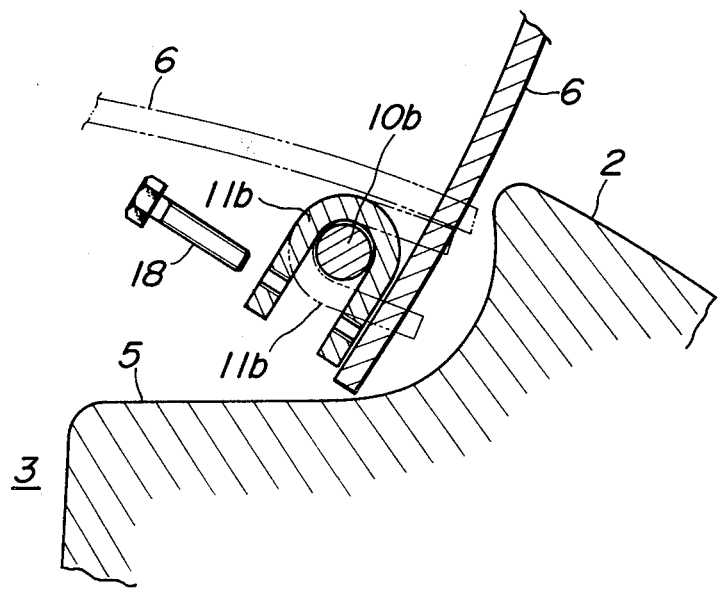

FIGS. 9A and 9B show another embodiment of the present invention, in which a lower cover-side hinge member 11b with a side left open but without using any steel sheet 12b. After the lower cover-side hinge member 11b is engaged with the corresponding lower body-side hinge member 10b, a bolt 18 is screwed to the cover-side hinge member 11b for closing the side open end thereof for preventing the body-side hinge member 10b from leaving the cover-side hinge member 11b. When the cover-side hinge member 11b is constructed as shown in FIGS. 9A and 9B, to mount the hinge member 11b to the lower body-side hinge member 10b, at first the upper cover-side hinge member 11a is fitted on the upper body-side hinge member 10a as in the case of the preceding embodiment, and the lower body-side hinge member 10b can be fitted into the lower cover-side hinge member 11b from a side direction through the side open end 12a of the latter. Accordingly, the need for pushing up the entire cover 6 to fit the lower cover-side hinge member 11b on the corresponding lower body-side hinge member 10b in the preceding embodiment can be eliminated. Thus, the registration of the cover-side hinge member 11b with the corresponding hinge member 10b with the former above the latter in the case of the preceding embodiment is unnecessary in this embodiment, so that an advantage of simplifying the assembling can be achieved.

In another embodiment shown in FIG. 10, upper and lower body-side hinge members 19a and 19b and upper and lower cover-side hinge members 20a and 20b are all made in plate-shape. Pin-holding portions 19a', 19b' and 20a' are secured to tips of the upper and lower body-side hinge members 19a, 19b and the upper cover-side hinge member 20a. The lower cover-side hinge member 20b is provided with a hinge pin 21 secured to the tip thereof. To assemble, at first the hinge pin 21 is inserted into the pin-holding portion 19b' of the lower body-side hinge member 19b, and the cover 6 is lowered and the upper cover-side and body-side pin-holding portions 19a' and 20a' of the corresponding hinge members are aligned and brought in contact with each other. Then, a hinge pin 22 is inserted through the pin-holding portions 19a' and 20a', and the assembling is completed. As can be seen from the figure, a notch 23 is formed at about the upper half of the pin-holding portion 19b' of the lower body-side hinge member 19b, so that the hinge pin 21 can be fitted in the pin-holding portion 19b' from a side direction, and the assembling is further simplified.

As described in the foregoing, according to the present invention, the cover-side hinge members can be detachably mounted to the body-side hinge members by dropping the cover while using the weight of the cover itself, so that the assembling is very simple. Furthermore, the cover is swingable about one side edge of the opening of a controller room for opening and closing the room, and the cover can be fastened simply by bolting the free end of the cover, for instance, at one point. Accordingly, the opening and closing of the cover at the time of maintenance and inspection of the controller can be simplified, and the operability of the cover is greatly improved.

Although the invention has been described with a certain degree of particularity, it is understood that the present disclosure has been made only by way of example and that numerous changes in details of construction and the combination and arrangement of parts may be resorted to without departing from the scope of the invention as hereinafter claimed.

What is claimed is:

1. In a battery-driven fork lift truck including at the rear end thereof a counterweight formed therein with a controller room having an opening in a substantially vertical rear end surface of the counterweight, and a comparatively thick and heavy cover which is mounted on the counterweight to close the opening, a structure for mounting the cover comprising in combination:

upper and lower body-side hinge members secured integrally to the counterweight along a vertical edge of the opening, said upper and lower body-side hinge members being steel bars with bent legs of the two hinge members extending toward each other; and upper and lower cover-side hinge members secured integrally to the cover along a vertical edge thereof so as to be engaged with and disengaged from the upper and lower body-side hinge members, respectively;

said upper cover-side hinge member being a bent steel sheet with a U-shaped cross section having a pair of horizontal legs extending in one direction, and first means extending across free ends of the legs to prevent horizontal displacement of the upper body-side hinge member when the upper body-side hinge member is in engagement with the upper cover-side hinge member;

said lower cover-side hinge member being a bent steel sheet with a U-shaped cross section having a pair of horizontal legs extending in opposite directions of the legs of said upper cover-side hinge member, second means extending across free ends of the legs to prevent horizontal displacement of the lower body-side hinge member when the lower body-side hinge member is in engagement with the lower cover-side hinge member, and third means extending across top edges of the legs to abut with the top end of the lower cover-side hinge member thus preventing the cover from displacing vertically downwards with respect to the counterweight.

2. The structure as claimed in claim 1, wherein said first means of the upper cover-side hinge member comprises a steel sheet welded to said free ends of said legs.

3. The structure as claimed in claim 1, wherein said second means of the lower cover-side hinge member comprises a steel sheet welded to said free ends of said legs so as to permit horizontal displacement of the lower body-side hinge member when the cover is lifted with the upper cover-side hinge member in engagement with the upper body-side hinge member, and to prevent horizontal displacement of the lower body-side hinge member when the cover is lowered until the top end of the lower body-side hinge member abuts against the third means to establish engagement of the lower body-side and cover-side hinge members.

4. The structure as claimed in claim 1, wherein said second means of the lower cover-side hinge member comprises a bolt detachably mounted across the free ends of said legs.

5. The structure as claimed in claim 1, wherein said third means of the lower cover-side hinge member comprises a steel sheet welded to said top edges of the lower cover-side hinge member.

6. A structure as claimed in claim 1, wherein a stopper is formed in the proximity of said hinged edge of the opening of the controller room, so as to limit the extent of opening motion of said cover.

7. A structure as claimed in claim 1, wherein a weather strip is secured to a back surface of said cover along peripheral edges thereof, so as to tightly contact with edges of said opening of the controller room as the cover is closed.

8. A structure as claimed in claim 1, wherein a bolt extending through a free edge of said cover is removably screwed into said edge of the opening of the controller room for fixing the cover in the closed position thereof.

* * * * *